WILLIAM STINE.

Improvement in Stove Pipe Joints.

No. 115,906.

Patented June 13, 1871.

Witnesses:

Inventor:
W. Stine
per
Attorneys.

UNITED STATES PATENT OFFICE.

WILLIAM STINE, OF ELMORE, OHIO.

IMPROVEMENT IN STOVE-PIPE JOINTS.

Specification forming part of Letters Patent No. 115,906, dated June 13, 1871.

*To all whom it may concern:*

Be it known that I, WILLIAM STINE, of Elmore, in the county of Ottawa and State of Ohio, have invented a new and useful Improvement in Connecting Smoke-Stack and Stove-Pipe Joints; and I do hereby declare that the following is a full, clear, and exact description thereof, which will enable others skilled in the art to make and use the same, reference being had to the accompanying drawing forming part of this specification.

This invention relates to a new and useful improvement in method of connecting the joints or lengths of pipe for smoke-stacks for steam-boilers or other purposes, as well as the joints of common stove-pipe or hot or cold air pipes within buildings; and consists in an open grooved ring of sheet metal, which, by means of a stud and cam or eccentric connected therewith, is expanded in diameter and made to tightly secure the ends of the pipe, as will be hereinafter more fully described.

Figure 1:
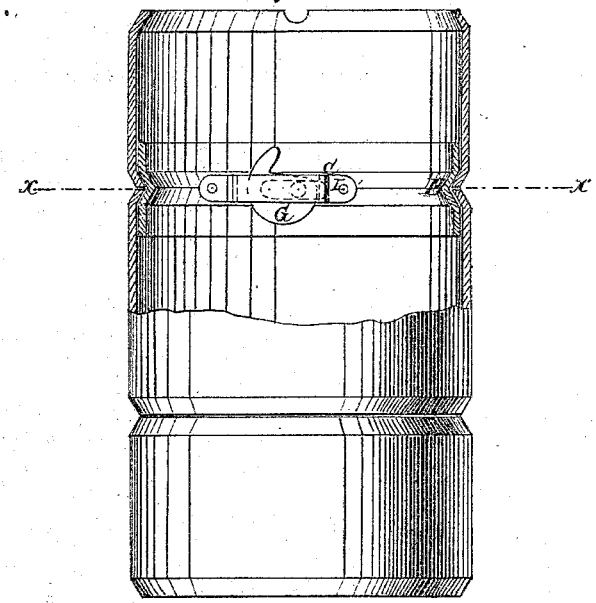
Figure 2:
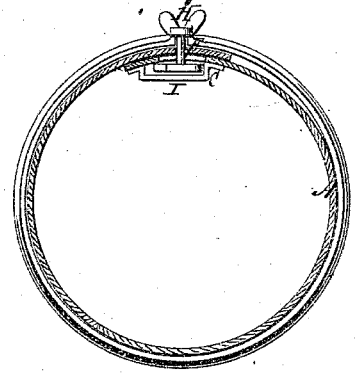
Figure 3:
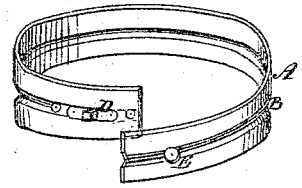

In the accompanying drawing, Figure 1 represents a sectional side view of two sections of pipe confined together according to my invention. Fig. 2 is a cross-section of Fig. 1 on the line $xx$. Fig. 3 is a view of the fastening-ring detached.

Similar letters of reference indicate corresponding parts.

A represents the ring, which is simply a piece of sheet metal curved to about the required diameter, with a groove or indentation, B, around it, and with a stud, C, and slot D near one end, and a hole, E, near the other end. F is a stud or pin, which passes through the hole E, and also through the slot D, upon the inner end of which is fastened the cam G. Upon the outer end of this stud thumb-ears H are riveted or fastened, by means of which the stud is turned, and the face of the cam is brought to bear against the fixed stud C. The ends of the joints of pipe are bent inward or beveled to correspond with the groove or indentation B in the ring, as seen in Fig. 1.

In this example of my invention there are two studs in the slot-end, connected by the strap I, which has shoulders; but the second stud and strap are designed for supporting the stud C. The cam may work either against the stud or the shoulder of I.

The operation will be readily understood from the drawing. The joints of pipe (whether large or small) being prepared by beveling their ends and making half a hole in each, so as to form an entire hole for the stud F to project, as seen in Fig. 2, they are placed together, with the ring inclosed and stud F projecting. The ring is now expanded by turning the stud F so as to bring the cam in contact with the stud C or shoulder of I and force it off till the ring-groove B receives the beveled ends of the joints and tightly fastens them together, as seen in Fig. 1.

The stud F may be turned by a key on its square end. When the thumb-ears are used they are riveted into the end of the stud after the ring has been placed within the joints of pipe.

This is a very convenient and effective method for connecting joints of pipe, whether it be the ordinary stove-pipe or pipe for smoke-stacks or other purposes.

Having thus described my invention, I claim as new and desire to secure by Letters Patent—

Connecting stove and other pipe by means of an adjustable ring expanded by a cam, constructed, arranged, and operated substantially as described.

WILLIAM STINE.

Witnesses:
J. B. D. CLARK,
HENRY LIVERGOOD.